Patented Apr. 23, 1940

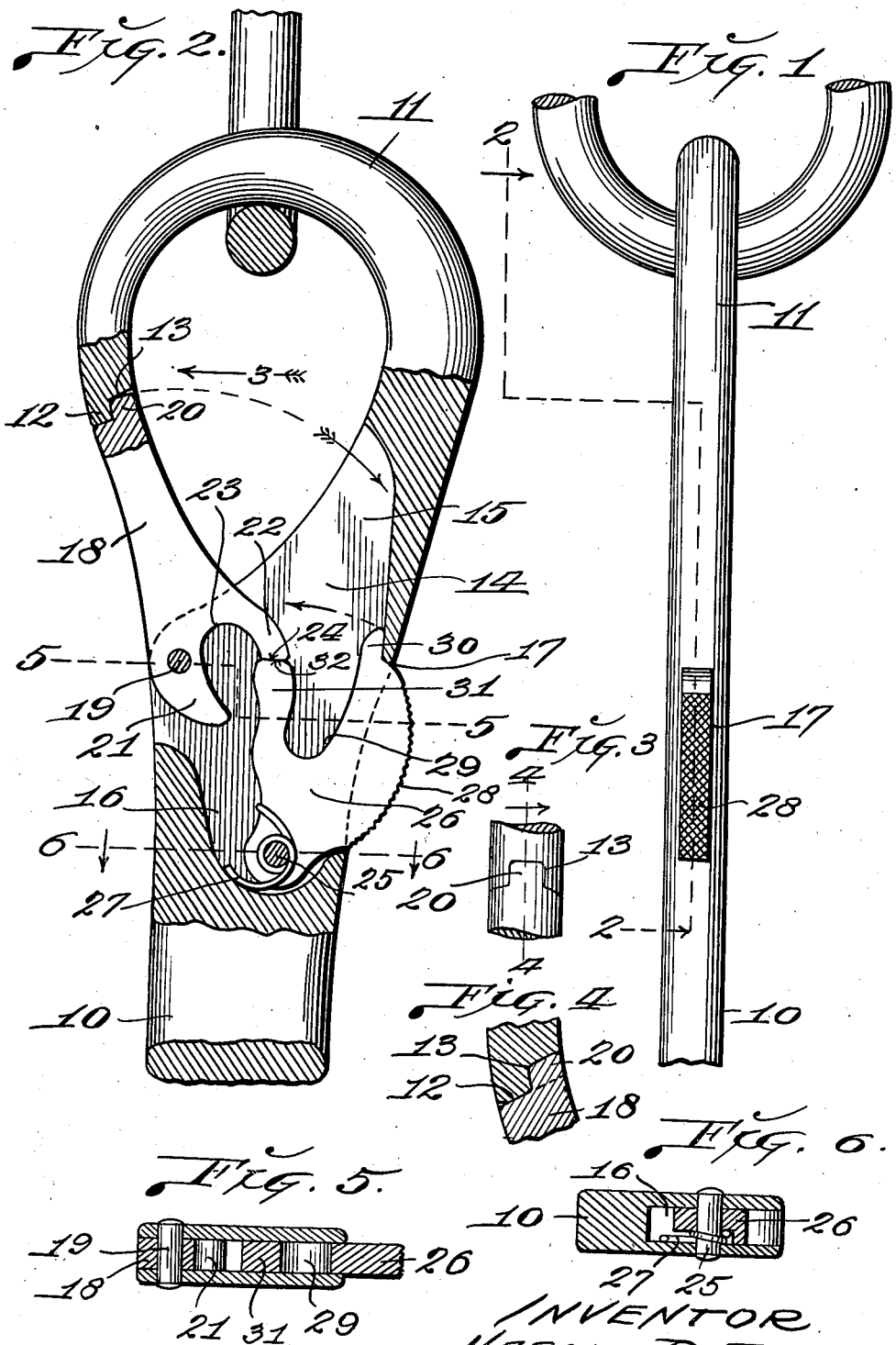

2,197,997

UNITED STATES PATENT OFFICE 2,197,997

SELF-LOCKING HOOK

Harold D. Dee, Los Angeles, Calif.

Application December 7, 1938, Serial No. 244,435

4 Claims. (Cl. 24—241)

My invention relates to a self-locking hook of the particular type forming the subject matter of U. S. Letters Patent No. 2,116,880 issued to me May 10, 1938, on self-locking cable hook and the principal objects of my present invention are, to generally improve upon and simplify the construction of the hook disclosed in my aforesaid patent, as well as other existing forms of similar hooks, and further, to provide a hook having a fulcrumed latch member or finger that normally closes the opening into the hook and being retained in such closed position, so that it can not be accidentally swung inward so as to open the hook as result of the latching finger being struck on the outside by an extraneous object.

A further object of my invention is, to provide a self-locking hook of the character referred to having a manually operable spring-held member that may be conveniently manipulated for swinging the latching finger into open position and a portion of which manually operable member engages a part of the latching finger at a point a substantial distance away from its fulcrum, so as to effectively maintain the latching finger in position to close the hook.

Further objects of my invention are, to provide a self-locking hook wherein the free end of the latching finger has an effective inter-engagement with the free end of the hook and thereby enabling the latching member to effectively resist laterally impressed strains or pressures that would otherwise tend to disengage the free end of the latching member from the free end of the hook and further, to provide a simple, strong, and durable self-locking hook that may be advantageously employed for various purposes, for instance, in the mooring of boats, for making positive yet readily releasable connections between cables used in hoisting equipment and, in connection with the safety belts utilized by firemen or by workmen engaged in the erection of pole or tower supported electrical equipment and the like.

With the foregoing and other objects in view, my invention consists in certain novel features of construction and arrangement of parts that will be hereinafter more fully described and claimed and illustrated in the accompanying drawing in which:

Fig. 1 is an edge view of a self-locking hook constructed in accordance with my invention.

Fig. 2 is an elevational view partly in section and taken on the line 2—2 of Fig. 1.

Fig. 3 is an elevational view taken looking in the direction indicated by arrow 3 in Fig. 2.

Fig. 4 is a vertical section taken on the line 4—4 of Fig. 3.

Fig. 5 is a horizontal section taken on the line 5—5 of Fig. 2.

Fig. 6 is a horizontal section taken on the line 6—6 of Fig. 2.

Referring by numerals to the accompanying drawing which illustrate a preferred embodiment of my invention, 10 designates a shank or handle which may be of any desired form and length and, formed integral with the end of said shank or handle is a hook 11 having the general contour of a conventional fishhook without the barb. Hook 11 is provided with a blunt free end 12 and, formed in said end on the inner side of the hook is a recess 13 that is somewhat narrower than the width or thickness of the end of the hook (see Fig. 3).

At the point where the main body or shank of the hook 11 joins the handle 10, the parts are provided with a longitudinally disposed chamber 14 having a portion 15 that extends upwardly into the shank or body of the hook 11 and this portion 15 is open on the inner side of the hook. The lower portion of chamber 14 extends downwardly a short distance into the shank or handle 10 as designated by 16 and, a slot or opening 17 is formed in the side of the shank or handle 10 below the shank of hook 11.

A hook closing latch or finger 18 is pivoted on a pin or bolt 19 that is seated in the walls of the shank or handle 10 to the sides of the chamber 14 on the opposite side of said shank from the slot or opening 17 and, the upper end of this hook closing finger normally bears on the free end of hook 11. In order to provide inter-engagement between the free end of latching member 18 and the end of the hook, a lug 20 projects from the end of said finger on the inner side thereof and which lug is adapted to occupy the notch or recess 13 when the latch is in position to close the opening into the hook. The engagement of the lug 20 in recess 13 provides a strong and substantial joint between the end of the latching finger and the end of the hook and effectively resists side strains or pressures that would tend to disengage the end of the latching finger from the hook.

The lower portion of latching member 18 extends a short distance into the chamber 14 and said end is bifurcated to form an outer finger 21 that extends below the pivot pin 19 and an inner finger 22 that projects into the upper central portion of chamber 14. Fingers 21 and 22 which are separated by a notch 23 are curved slightly toward each other and the end of the inner finger 22 is provided with a substantially flat end 24 which, when the latching member 18 is in closed position occupies a plane that intersects the axis of pivot pin 19 and which plane is substantially at right angles to the axis of the shank or handle 10.

Seated in the walls of shank 10 to the sides of the pocket or lower portion 16 of the chamber 14 are the ends of a pin or bolt 25 and, pivoted thereon is the lower portion of a latch releasing member 26. The coiled portion of a spring 27 surrounds the pivot pin or bolt 25 with one end of said spring bearing against the bottom of pocket 16 and the opposite end engaging the edge of member 26 opposite the edge that projects through opening 17.

The edge of the outer portion of latch actuating member 26 that projects through the opening 17 is preferably knurled or ribbed as designated by 28 in order that it may be conveniently engaged and pressed inwardly by the thumb when the member 16 is manipulated to swing the latching finger 18 into open position.

Formed in the upper portion of member 26 and extending downwardly from its upper end toward pivot pin 25 is a notch 29 and a portion of member 26 between the upper end of this notch and the upper end of the knurled surface 28 is extended upwardly to form a short lip 30 that normally engages against the wall of the shank or body of the hook 11 immediately above slot or opening 27, thus limiting the outward swinging movement of the latch operating and locking member 26.

Projecting upwardly from the inner central portion of member 26 and in substantial vertical alignment with pivot pin 25, is a finger 31 provided with a flat upper end surface 32 that is adapted to engage the flat under face 24 of finger 22 on the latch member 18 when the latter is in closed position.

Under normal conditions or when the hook is closed, the various parts occupy the positions as illustrated in Fig. 2, with the flat end 32 of finger 31 bearing directly against the flat end 24 of finger 22, thus effectively holding the latching member 18 in hook closing position and it is impossible for the latching member to be swung inwardly as a result of being struck or pressed inwardly from the outside by an extraneous object.

When the hook is closed, the spring 27 holds the latch operating member 26 in position, with the lip 30 against the wall of the hook immediately above the upper end of slot 17 and thus, the latching member is positively held in hook closing position.

It will be noted that when the hook closing latch is in closed position, the substantially flat contacting surfaces 24 and 32 on the fingers 22 and 31 respectively, occupy a plane that approximately intersects the axis of pivot pin 19 and said contacting flat faces are disposed a substantial distance above the pivot pin 25 and, such arrangement is highly effective in securely maintaining the latching member in closed position.

In order to release or open the hook closing latch 18, it is only necessary to engage the knurled surface 28 of member 26 and press the same inwardly against the yielding resistance offered by spring 27 and, as such movement takes place the end of finger 31 leaves the end of finger 22 and after moving across the notch 23 said finger 31 engages finger 21, thereby swinging the latching finger 18 on its axis so that the upper portion thereof moves across the opening in the hook and, the upper end of said latching member enters the upper end of the recess 15 that extends upwardly from chamber 14. During this opening movement of the latching member 18, the finger 22 swings downwardly into recess 29 in member 26 and the upper portion of the notch 23 accommodates the upper portion of finger 31.

As soon as the inward pressure is relieved on member 26, spring 27 will act to instantly restore the parts to their normal positions, with the free end of latching member 18 engaging the free end of hook 11 and with the flat faces on the ends of the fingers 22 and 31 in direct engagement with each other to effectively hold the hook closing member in closed position.

Thus it will be seen that I have provided a self locking hook that is relatively simple in construction, inexpensive of manufacture, and very effective in performing the functions for which it is intended.

The entire structure comprises few parts and, the hook closing member and the member that actuates said hook closing member are constructed and arranged so as to counteract to a maximum degree, the possibility of the hook becoming opened from accidental causes.

It will be understood that minor changes in the size, form and construction of the various parts of my improved self-locking hook, may be made and substituted for those herein shown and described, without departing from the spirit of my invention, the scope of which is set forth in the appended claims.

I claim as my invention:

1. A self-locking hook comprising a shank, a hook formed on one end of said shank, there being an opening formed in said shank, a portion of which opening extends into the body of the hook, a hook closing member having one end pivotally mounted in the upper portion of said opening in said shank, the free end of which member is adapted to engage the free end of said hook to close the same, a member pivotally mounted in the extreme lower portion of said opening in the shank for actuating the hook closing member and co-operating means on said hook closing member and said actuating member for positively holding the hook closing member in closed position.

2. A self-locking hook as set forth in claim 1 and a spring having a portion coiled about the pivot of said actuating member, one end of which spring bears against said actuating member and the other end bearing against the bottom of the opening in said shank.

3. In a self-locking hook, a shank, a hook formed thereon, there being a chamber in the shank, a portion of which chamber extends into the body portion of the hook, a hook closing member having one end pivotally mounted in the upper portion of the chamber in said shank, a spring held member pivotally mounted in the extreme lower portion of the chamber in said shank for actuating said hook closing member, there being an opening formed through the wall of the shank to the side of the chamber therein, a portion of which actuating member projects through said last mentioned opening and opposed fingers formed on said hook closing member and said actuating member, the ends of which opposed fingers have flat faces adapted to abut each other when the hook closing member is in closed position.

4. A self-locking hook as set forth in claim 3, with said hook closing member and said hook actuating member having notches for the reception of said fingers when the hook closing member is swung into open position by said actuating member.

HAROLD D. DEE.